(12) United States Patent
Scott

(10) Patent No.: US 12,460,443 B1
(45) Date of Patent: Nov. 4, 2025

(54) INLINE FENCE STRAINER RATCHET

(71) Applicant: Charles Scott, Robbins, NC (US)

(72) Inventor: Charles Scott, Robbins, NC (US)

(*) Notice: Subject to any disclaimer, the term of this patent is extended or adjusted under 35 U.S.C. 154(b) by 203 days.

(21) Appl. No.: 18/233,358

(22) Filed: Aug. 14, 2023

(51) Int. Cl.
*E04H 17/00* (2006.01)
*E04H 17/02* (2006.01)

(52) U.S. Cl.
CPC ................. *E04H 17/133* (2021.01)

(58) Field of Classification Search
CPC ....... E04H 17/127; E04H 17/133; B66D 1/34; B66D 3/02
See application file for complete search history.

(56) References Cited

U.S. PATENT DOCUMENTS

| | | | | |
|---|---|---|---|---|
| 541,154 | A * | 6/1895 | Ebert | E04H 17/133 256/57 |
| 2,506,029 | A * | 5/1950 | Maasdam | F16G 11/12 254/218 |
| 5,660,377 | A | 8/1997 | Specht | |
| 9,820,446 | B2 | 11/2017 | Parrish | |
| 2003/0094602 | A1 | 5/2003 | House et al. | |
| 2004/0119059 | A1 | 6/2004 | Reiff | |
| 2005/0161657 | A1 | 7/2005 | Dennis | |
| 2010/0051887 | A1* | 3/2010 | Wooster | F16G 11/12 242/396.4 |
| 2011/0193040 | A1 | 8/2011 | Reid | |
| 2012/0138882 | A1* | 6/2012 | Moore | F16G 11/12 256/40 |
| 2012/0295468 | A1 | 11/2012 | Campbell | |
| 2015/0144855 | A1 | 5/2015 | Robbins, III et al. | |

FOREIGN PATENT DOCUMENTS

| | | | |
|---|---|---|---|
| NZ | 20080570800 A | 5/2010 | |
| WO | WO-2017018891 A1 * | 2/2017 | .......... E04H 17/133 |

* cited by examiner

*Primary Examiner* — Emmanuel M Marcelo
(74) *Attorney, Agent, or Firm* — Cramer Patent & Design; Aaron R. Cramer

(57) ABSTRACT

The inline fence strainer ratchet may comprise a ratchet, a cable, a wire thimble, and a sleeve. The ratchet chief inline fence strainer may be operable to tighten high tensile wire while installing or repairing a fence. The ratchet may be operable to pull the high tensile wire via the cable instead of pulling the high tensile wire directly. The ratchet chief inline fence strainer may be configured to couple to the high tensile wire by passing the free end of the high tensile wire through the wire thimble located at one end of the cable, bending the high tensile wire back 180 degrees, and crimping the sleeve onto the high tensile wire to retain the high tensile wire on the wire thimble. The opposite end of the cable may then be pulled using the ratchet in order to tighten the high tensile wire.

12 Claims, 3 Drawing Sheets

INLINE FENCE STRAINER RATCHET

RELATED APPLICATIONS

None.

FIELD OF THE DEVICE

The present device relates generally to a ratchet and more specifically to a ratchet for straining inline fences.

BACKGROUND OF THE DEVICE

For many years, wire fences have served as the primary method of animal containment on farms and ranches located all throughout the United States. The rolls of this kind of fence, which are provided by the manufacturer, are secured with screws to upright posts. This fence is not too expensive, is simple to put up, and does a decent job of keeping animals like horses, cattle, sheep, goats, and others like them contained.

Other types of fences, such as electrified fences and barbed wire fences, also make use of wire rails arranged in a manner similar to that described above. When doing routine maintenance on these types of fences, it is often required to tighten the wire since the wire tends to stretch with time. In such a procedure, it is common practice to make use of an inline fence strainer ratchet known as an in-line fence strainer.

This kind of tool is useful, but in order for it to function properly, the fence must either be unbroken or at least be of a length that is enough for reattachment. However, many who work on farms and ranches are aware that this is not always the case. Because of this, there is a need for a method that makes it possible to quickly repair wire fence in a way that takes into account the issues that have been discussed. The development of the inline fence strainer ratchet is an example of an easy and effective solution.

SUMMARY OF THE DEVICE

Embodiments of the present disclosure may include an inline fence strainer ratchet including a ratchet including a frame. Embodiments may also include a spool. Embodiments may also include a spring clip. Embodiments may also include a cable secured to the spool. Embodiments may also include a wire thimble.

Embodiments may also include a sleeve. In some embodiments, a distal end of the cable may be secured to the wire thimble by the sleeve. In some embodiments, the ratchet pulls a high tensile wire via the cable instead of directly pulling the high tensile wire. In some embodiments, the cable may be coupled to the high tensile wire by passing a free end of the high tensile wire through the wire thimble, bending the high tensile wire back 180 degrees, and crimping the sleeve onto the high tensile wire to retain it on the wire thimble. In some embodiments, the ratchet may be coupled to a fence post to pull the high tensile wire, via the cable, towards the fence post to tighten the high tensile wire.

In some embodiments, the frame may be a Y-shaped armature including separated arms located at one end and a narrow end located at the opposite end, the narrow end being configured for attachment to the fence post. In some embodiments, the spool may be supported between the separated arms of the frame and may include a left ratchet gear, a right ratchet gear, and a central shaft.

In some embodiments, the left ratchet gear and the right ratchet gear may be identical gears coupled to the central shaft, and each gear may include a plurality of teeth forming hooks with gullets. In some embodiments, the central shaft extends outside of the frame and may include a tool attachment end configured for detachable coupling to a tool to turn the central shaft.

In some embodiments, the spring clip prevents the spool from turning in a loosening direction to maintain tension on the high tensile wire. In some embodiments, the spring clip may include a bottom clip arm pivotably coupled to the frame, a top clip arm located above the frame and parallel to the bottom clip arm, and right and left clip arms coupling the bottom clip arm to the top clip arm.

In some embodiments, the spring clip presses against the left ratchet gear and the right ratchet gear. In some embodiments, the cable may be flexible stainless steel wire rope. In some embodiments, the cable has a length of two to four feet. In some embodiments, the wire thimble may be a teardrop-shaped armature that guides the cable to form a loop and keeps the center of the loop open under tension.

In some embodiments, the sleeve may be a double barrel wire rope ferrule that retains the high tensile wire on the wire thimble. In some embodiments, the high tensile wire may be a high-carbon fencing wire with a carbon content at least twice that of a low-carbon wire. In some embodiments, the inline fence strainer ratchet, configured to tighten the high tensile wire while installing or repairing a fence.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
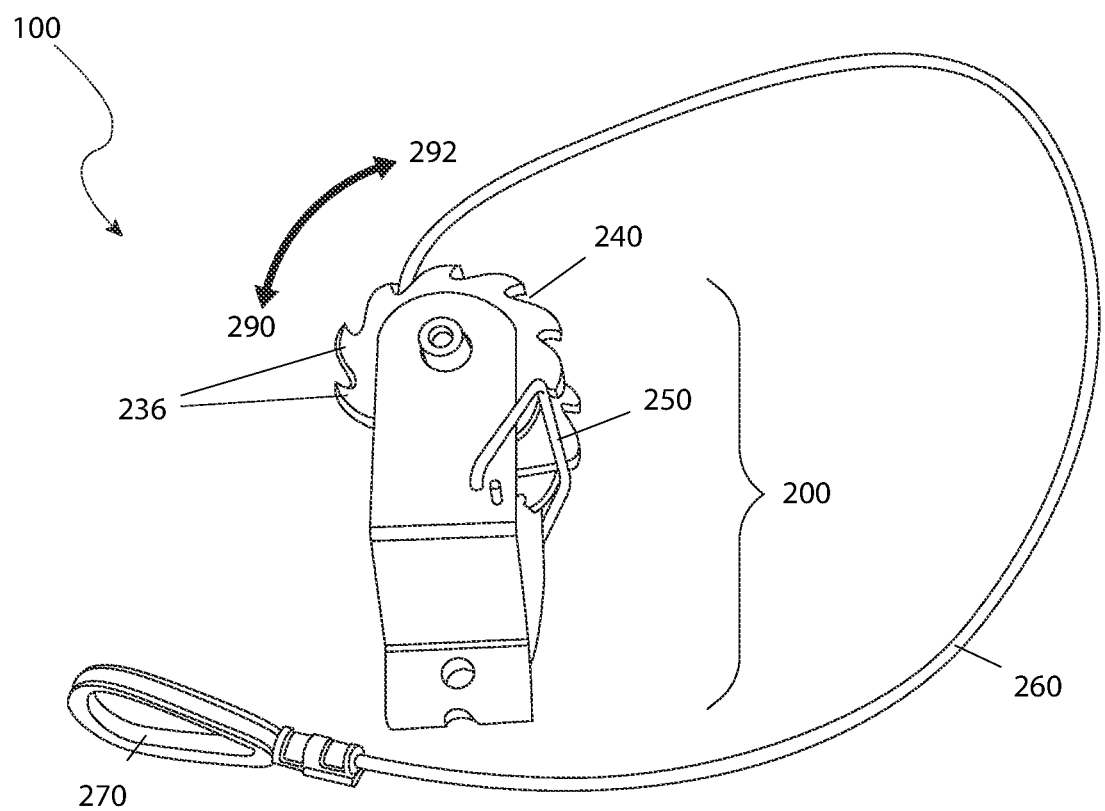
FIG. 1 is an isometric view of an inline fence strainer ratchet 100, according to an embodiment of the present device.
Figure 2:
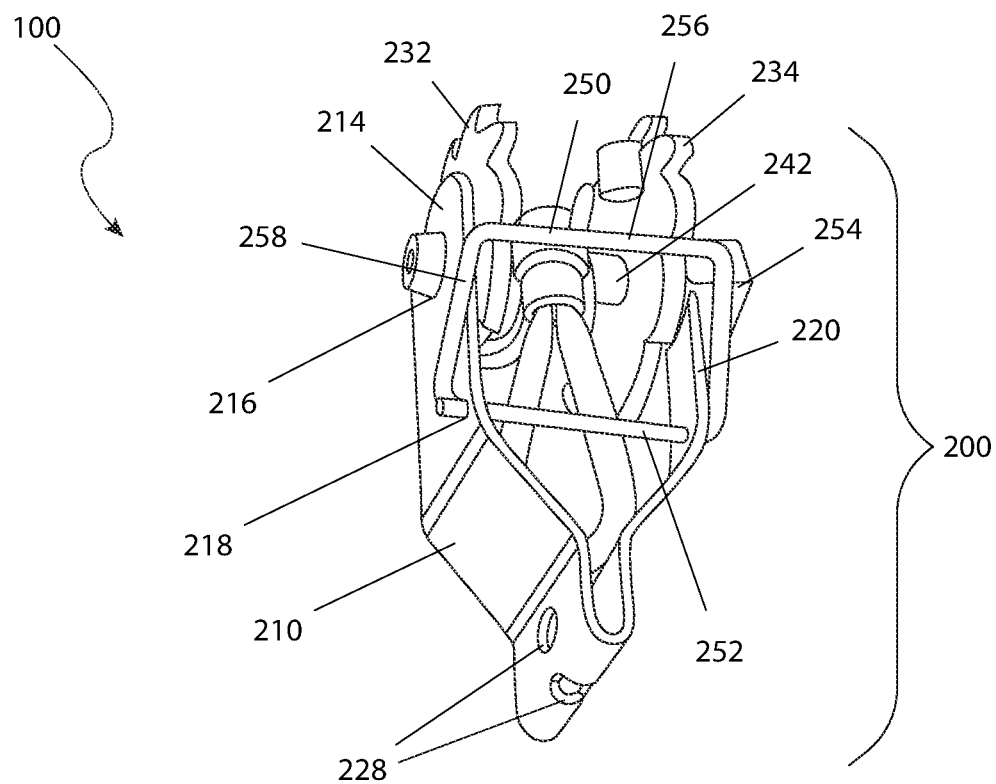
FIG. 2 is an isometric view of an inline fence strainer ratchet 100, according to an embodiment of the present device, illustrating the inline fence strainer ratchet 100 rolled up for shipping.
Figure 3:
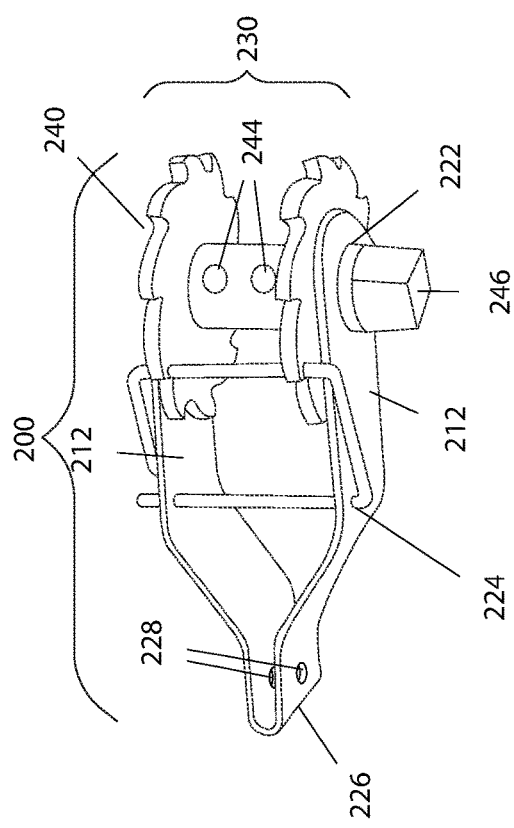
FIG. 3 is a detail view of an inline fence strainer ratchet 100, according to an embodiment of the present device, illustrating the ratchet 200.
Figure 4:
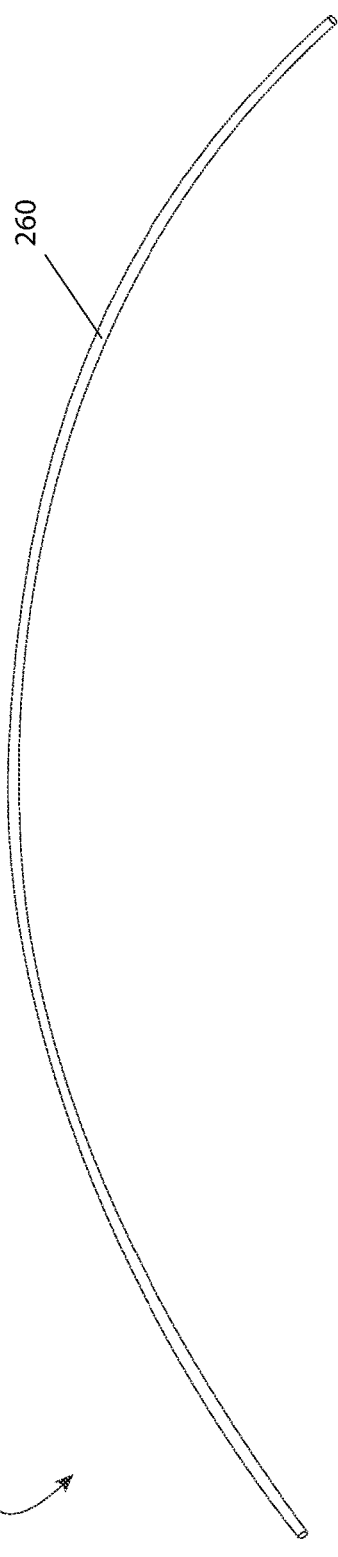
FIG. 4 is a detail view of an inline fence strainer ratchet 100, according to an embodiment of the present device, illustrating the cable 260.
Figure 5:
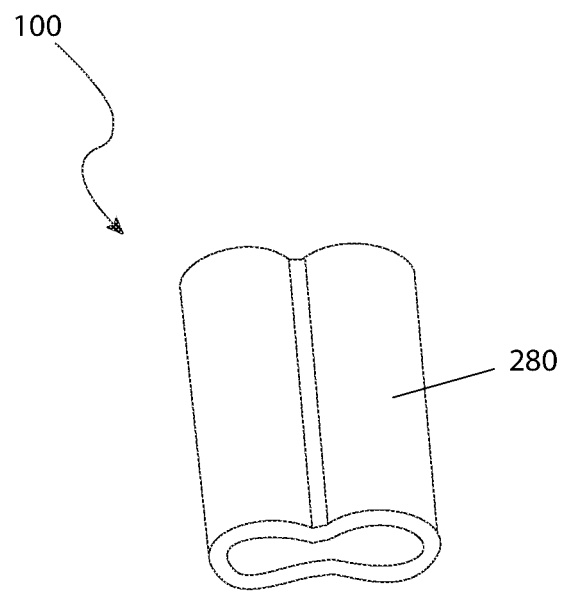
FIG. 5 is a detail view of an inline fence strainer ratchet 100, according to an embodiment of the present device, illustrating the sleeve 280.
Figure 6:
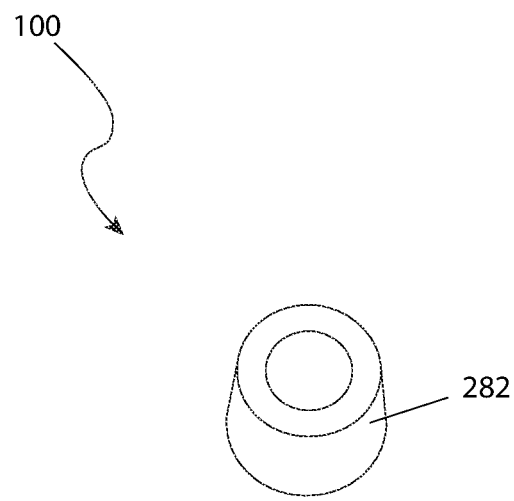
FIG. 6 is a detail view of an inline fence strainer ratchet 100, according to an embodiment of the present device, illustrating the wire rope ferrule 282; and, FIG. 7 is a detail view of an inline fence strainer ratchet 100, according to an embodiment of the present device, illustrating the wire thimble 270.
Figure 7:
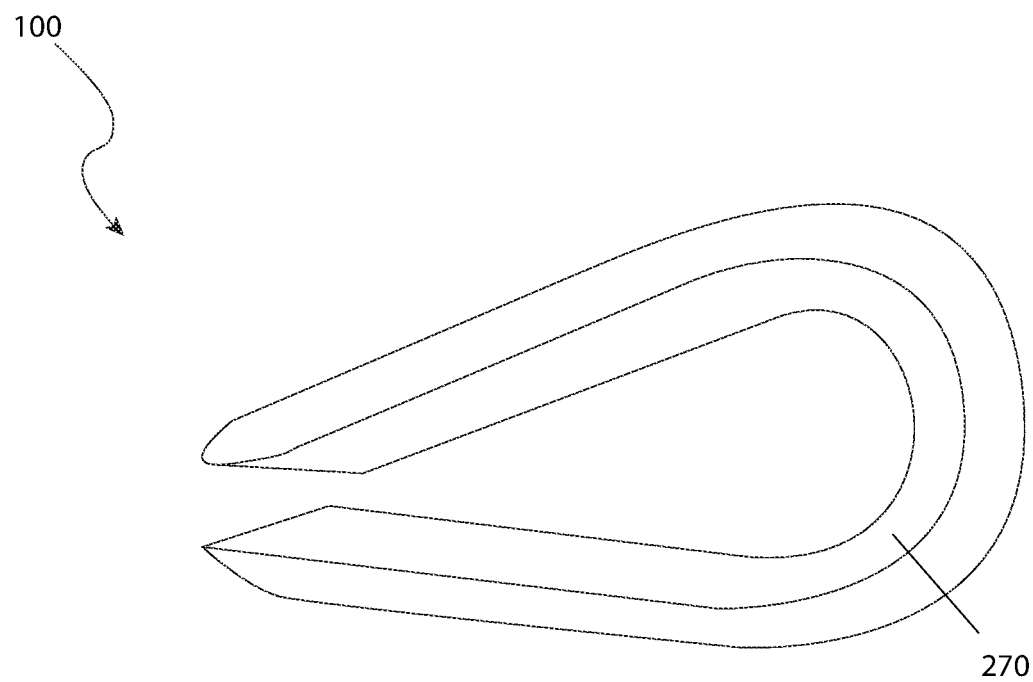

DESCRIPTIVE KEY 100 inline fence strainer ratchet
200 ratchet
210 frame
212 separated arms
214 left arm
216 left spool aperture 218 left spring aperture
220 right arm
222 right spool aperture
224 right spring aperture
226 narrow end
228 mounting aperture
230 spool
232 left ratchet gear
234 right ratchet gear
236 plurality of teeth
240 gullet
242 central shaft
244 wire aperture
246 tool attachment end
250 spring clip
252 bottom clip arm
254 right clip arm
256 top clip arm
258 left clip arm
260 cable
270 wire thimble
280 sleeve
282 wire rope ferrule
290 tightening direction
292 loosening direction

DESCRIPTION OF THE DEVICE

The present device is directed to an inline fence strainer ratchet (herein described as the "device") 100. The inline fence strainer ratchet 100 may comprise a ratchet 200, a cable 260, a wire thimble 270, and a sleeve 280. The inline fence strainer ratchet 100 may be operable to tighten high tensile wire while installing or repairing a fence. The ratchet 200 may be operable to pull the high tensile wire via the cable 260 instead of pulling the high tensile wire directly. The inline fence strainer ratchet 100 may be configured to couple to the high tensile wire by passing the free end of the high tensile wire through the wire thimble 270 located at one (1) end of the cable 260, bending the high tensile wire back one hundred degrees (180°), and crimping the sleeve 280 onto the high tensile wire to retain the high tensile wire on the wire thimble 270. The opposite end of the cable 260 may then be pulled using the ratchet 200 in order to tighten the high tensile wire.

As used herein, "high tensile wire" may refer to high-carbon fencing wire having a carbon content that is at least twice the carbon content of low-carbon wire. As non-limiting examples, low-carbon wire may have a carbon content of no more than one-tenth of a percent (0.10%) and high-tensile wire may have a carbon content of approximately twenty-eight percent (28%). The higher carbon content may enable a thinner wire to be used with fewer fence posts, lighter weight wire, and less sagging. The high-tensile wire may be electrified for use in electric fences.

When the high tensile wire is pulled by a prior-art inline strainer device directly, the high tensile wire may become mishappen, kinked, or otherwise difficult to handle. The inline fence strainer ratchet 100 may avoid this issue by wrapping the cable 260 onto a spool 230 of the ratchet 200 instead of wrapping the high tensile wire.

The ratchet 200 may comprise a frame 210, the spool 230, and a spring clip 250. The ratchet 200 may be coupled to a fence post such that the high tensile wire may be pulled, via the cable 260, towards the fence post in order to tighten the high tensile wire.

The frame 210 may be a Y-shaped armature comprising separated arms 212 located at one (1) end of the frame 210 and a narrow end 226 located at the opposite end of the frame 210. The separated arms 212 may be operable to hold the spool 230 and the spring clip 250. The narrow end 226 may be configured to attachment to the fence post.

A left arm 214 selected from the separated arms 212 may comprise a left spool aperture 216 and one (1) or more left spring apertures 218. A right arm 220 selected from the separated arms 212 may comprise a right spool aperture 222 and one (1) or more right spring apertures 224. The left spool aperture 216 and the right spool aperture 222 may rotationally couple the spool 230 to the frame 210 such that the spool 230 is supported between the separated arms 212. The left spring apertures 218 and the right spring apertures 224 may couple the spring clip 250 to the frame 210 such that the spring clip 250 is oriented to press against the spool 230.

The narrow end 226 may comprise one (1) or more mounting apertures 228. The frame 210 may be coupled to the fence post using the mounting apertures 228. As a non-limiting example, the frame 210 may be coupled to the fence post my passing a mounting wire through the mounting apertures 228 and around the fence post or other mounting hardware.

The spool 230 may comprise a left ratchet gear 232, a right ratchet gear 234, and a central shaft 242. The spool 230 may be operable to pull the cable 260 into the ratchet 200 by turning the spool 230 in a tightening direction 290 and to release the cable 260 from the ratchet 200 by turning the spool 230 in a loosening direction 292.

The left ratchet gear 232 and the right ratchet gear 234 may be identical gears coupled to the central shaft 242. The left ratchet gear 232 and the right ratchet gear 234 may be parallel planes to each other. An individual ratchet gear selected from the left ratchet gear 232 and the right ratchet gear 234 may comprise a plurality of teeth 236. An individual tooth selected from the plurality of teeth 236 may curve tangentially to form a hook. The hook may define a gullet 240 that the spring clip 250 may press against to prevent the spool 230 from turning in the loosening direction 292.

The hooks on the left ratchet gear 232 and the hooks on the right ratchet gear 234 may face in the same rotational direction. The spring clip 250 may flex away from the central shaft 242 as the spool 230 is turned in the tightening direction 290 such that the spring clip 250 rides over the plurality of teeth 236 and falls into place at the gullets 240. The spool 230 may be prevented from turning in the loosening direction 292 unless the spring clip 250 is manually lifted clear of the gullets 240. Lifting the spring clip 250 clear of the gullets 240 may require turning the spool 230 in the tightening direction 290 to disengage the spring clip 250 from the gullets 240 while lifting the spring clip 250 and then reversing direction of the spool 230 to turn the spool 230 in the loosening direction 292.

The central shaft 242 may maintain the spacing between the left ratchet gear 232 and the right ratchet gear 234. The central shaft 242 may comprise one (1) or more wire apertures 244 passing through the central shaft 242 between the left ratchet gear 232 and the right ratchet gear 234. The wire apertures 244 may retain the cable 260 to the central shaft 242. The central shaft 242 may extend outside of the frame 210 and may comprise a tool attachment end 246. The tool attachment end 246 may be configured for a tool to detachably couple to the central shaft 242 in order to turn the central shaft 242 using the tool. As non-limiting examples, the tool may be locking pliers, a crescent wrench, or a specialized fence tool that is designed for use with the ratchet 200.

The spring clip 250 may comprise spring wire bent into a generally rectangular shape. The spring clip 250 may prevent the spool 230 from turning in the loosening direction 292 so that tension may be maintained on the high tensile wire coupled to the cable 260. A bottom clip arm 252 of the spring clip 250 may pivotably couple to the frame 210 by passing through one (1) of the left spring apertures 218 and through one (1) of the right spring apertures 224. A top clip arm 256 may be located above the frame 210 and may run parallel to the bottom clip arm 252. A right clip arm 254 and a left clip arm 258 may couple the bottom clip arm 252 to the top clip arm 256 on the right and left side, respectively. The separation distance between the bottom clip arm 252 and the top clip arm 256 may be established by the right clip arm 254 and the left clip arm 258 and may permit the top clip arm 256 to move into the gullets 240 on the plurality of teeth 236 of the spool 230 as the spring clip 250 pivots towards the spool 230. The bottom end of the left clip arm 258 may bend ninety degrees (90°) to engage a second one (1) of the left spring apertures 218. This may place tension on the spring clip 250 such that the spring clip 250 tends to press against the left ratchet gear 232 and the right ratchet gear 234.

The cable 260 may be flexible stainless steel wire rope that may be wrapped around the spool 230. The cable 260 may be wound onto the spool 230 to tighten the high tensile wire that is coupled to the cable 260. The cable 260 may be unwound from the spool 230 to loosen the high tensile wire. In a preferred embodiment, the cable 260 may have a length of two feet to four feet (2-4 ft.).

One (1) end of the cable 260 may be coupled to the central shaft 242 of the spool 230. As a non-limiting example, the cable 260 may pass through the any of the wire apertures 244 of the central shaft 242 and a wire rope ferrule 282 may be crimped onto the cable 260 to prevent the cable 260 from sliding out of wire aperture 244.

The opposite end of the cable 260 may be coupled to the wire thimble 270. The wire thimble 270 may be a teardrop-shaped armature that guides the cable 260 to form a loop. The wire thimble 270 may be operable to keep the center of the loop open even when the cable is under tension. As a non-limiting example, a ferrule may be crimped onto the cable 260 after the cable 260 encircles the wire thimble 270 in order to retain the cable 260 on the wire thimble 270.

The sleeve 280 may be a double barrel wire rope ferrule that may be coupled to the high tensile wire to retain the high tensile wire on the wire thimble 270. As a non-limiting example, the sleeve 280 may slide onto the free end of the high tensile wire, the free end of the high tensile wire may pass through the wire thimble 270, the high tensile wire may be folded back one hundred eighty degrees (180°), the sleeve 280 may slide towards the wire thimble 270 to capture the free end of the high tensile wire, and the sleeve 280 may be crimped to retain the high tensile wire on the wire thimble 270.

In use, the ratchet 200 may be coupled to a fence post at a desired height. As a non-limiting example, mounting wire may be passed through the mounting apertures 228 located in the narrow end 226 of the frame 210 of the ratchet 200 and around the fence post or around insulators mounted to the fence post. The cable 260 may be unwound from the spool 230 by disengaging the spring clip 250 from the plurality of teeth 236 of the spool 230 and allowing the spool 230 to turn in the loosening direction 292. The sleeve 280 may be placed onto the free end of the high tensile wire and the free end of the high tensile wire may be passed through the center of the wire thimble 270. The free end of the high tensile wire may be folded back one hundred eighty degrees (180°), the sleeve 280 may be moved to pass over the free end of the high tensile wire, and the sleeve 280 may be crimped onto the high tensile wire. The spool 230 may be turned in the tightening direction 290 using a tool such that the high tensile wire is pulled towards the ratchet 200 to a desired tension. If it becomes necessary to repair the fence, tension may be relieved from the high tensile wire by disengaging the spring clip 250 from the plurality of teeth 236 of the spool 230 and by turning the spool 230 in the loosening direction 292.

The exact specifications, materials used, and method of use of the inline fence strainer ratchet 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. An inline fence strainer ratchet comprising:
   a ratchet comprising:
      a frame;
      a spool; and,
      a spring clip; and,
   a cable secured to the spool;
   a wire thimble; and,
   a sleeve; and,
   wherein a distal end of the cable is secured to the wire thimble by the sleeve;
   wherein the ratchet pulls a high tensile wire via the cable instead of directly pulling the high tensile wire;
   wherein the cable is coupled to the high tensile wire by passing a free end of the high tensile wire through the wire thimble, bending the high tensile wire back 180 degrees, and crimping the sleeve onto the high tensile wire to retain it on the wire thimble;
   wherein the ratchet is coupled to a fence post to pull the high tensile wire, via the cable, towards the fence post to tighten the high tensile wire;
   wherein the sleeve is a double barrel wire rope ferrule that retains the high tensile wire on the wire thimble;
   wherein the high tensile wire is a high-carbon fencing wire with a carbon content at least twice that of a low-carbon wire;
   wherein the low-carbon wire has a carbon content of no more than 0.10%, and the high tensile wire has a carbon content of approximately 28%; and,
   wherein the high-tensile wire is electrified for use in electric fences.

2. The inline fence strainer ratchet of claim 1, wherein the frame is a Y-shaped armature comprising separated arms located at one end and a narrow end located at the opposite end, the narrow end being configured for attachment to the fence post.

3. The inline fence strainer ratchet of claim 2, wherein the spool is supported between the separated arms of the frame and comprises a left ratchet gear, a right ratchet gear, and a central shaft.

4. The inline fence strainer ratchet of claim 3, wherein the left ratchet gear and the right ratchet gear are identical gears coupled to the central shaft, and each gear comprises a plurality of teeth forming hooks with gullets.

5. The inline fence strainer ratchet of claim 4, wherein the central shaft extends outside of the frame and comprises a tool attachment end configured for detachable coupling to a tool to turn the central shaft.

6. The inline fence strainer ratchet of claim 5, wherein the spring clip prevents the spool from turning in a loosening direction to maintain tension on the high tensile wire.

7. The inline fence strainer ratchet of claim 6, wherein the spring clip comprises a bottom clip arm pivotably coupled to the frame, a top clip arm located above the frame and parallel to the bottom clip arm, and right and left clip arms coupling the bottom clip arm to the top clip arm.

8. The inline fence strainer ratchet of claim 7, wherein the spring clip presses against the left ratchet gear and the right ratchet gear.

9. The inline fence strainer ratchet of claim 8, wherein the cable is flexible stainless steel wire rope.

10. The inline fence strainer ratchet of claim 9, wherein the cable has a length of two to four feet.

11. The inline fence strainer ratchet of claim 1, wherein the wire thimble is a teardrop-shaped armature that guides the cable to form a loop and keeps the center of the loop open under tension.

12. The inline fence strainer ratchet of claim 1, configured to tighten the high tensile wire while installing or repairing a fence.

* * * * *